(12) United States Patent
Arold et al.

(10) Patent No.: US 6,338,514 B1
(45) Date of Patent: Jan. 15, 2002

(54) CENTRAL CONSOLE FOR VEHICLES

(75) Inventors: Klaus Arold, Sindelfingen; Matthias Kornibe, Bodelshausen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/626,958

(22) Filed: Jul. 27, 2000

(30) Foreign Application Priority Data

Jul. 27, 1999 (DE) ......................................... 199 35 270

(51) Int. Cl.$^7$ ................................................. B06P 3/05
(52) U.S. Cl. ...................... 296/24.1; 296/208; 454/141; 454/152; 454/143
(58) Field of Search ............................... 296/24.1, 208; 454/141–144, 152, 155; 237/12.3 R

(56) References Cited

U.S. PATENT DOCUMENTS

| 3,356,409 A | * 12/1967 | Belsky et al. ............... 296/24.1 |
| 3,646,876 A | * 3/1972 | Atkinson et al. ............ 454/141 |
| 4,343,230 A | * 8/1982 | Landstorm .................. 296/208 |
| 4,494,597 A | * 1/1985 | Fukami et al. ............... 454/141 |
| 4,782,742 A | * 11/1988 | Yott et al. ................... 454/152 |
| 4,947,735 A | * 8/1990 | Guillemin ................... 454/152 |
| 5,186,237 A | * 2/1993 | Adasek et al. .............. 454/143 |
| 5,462,483 A | * 10/1995 | Loup ........................... 454/152 |
| 5,673,964 A | * 10/1997 | Roan et al. .................. 296/208 |
| 5,902,181 A | * 5/1999 | Bain ............................ 454/143 |
| 5,934,744 A | * 8/1999 | Jergens et al. .............. 296/208 |
| 5,979,540 A | * 11/1999 | Alison et al. ................ 296/208 |
| 6,019,288 A | * 2/2000 | Arold et al. ................. 454/152 |
| 6,019,676 A | * 2/2000 | Kim ............................. 454/155 |
| 6,048,263 A | * 4/2000 | Uchida et al. ............... 454/144 |
| 6,071,591 A | * 6/2000 | Dausch ........................ 454/143 |
| 6,080,059 A | * 6/2000 | Kim ............................. 454/155 |
| 6,110,037 A | * 8/2000 | Yoshinaka ................... 454/143 |
| 6,139,423 A | * 10/2000 | Wadey ......................... 454/142 |
| 6,152,522 A | * 11/2000 | Boulay ......................... 296/208 |
| 6,231,098 B1 | 5/2001 | Schenk et al. .............. 296/37.8 |

FOREIGN PATENT DOCUMENTS

| GB | 2 312 189 | 10/1997 |
| GB | 2 338 459 | 12/1999 |

OTHER PUBLICATIONS

UK Combined Search and Examination Report (mailed Feb. 22, 2001).

* cited by examiner

*Primary Examiner*—Joseph D. Pape
*Assistant Examiner*—Kiran B. Patel
(74) *Attorney, Agent, or Firm*—Crowell & Moring LLP

(57) ABSTRACT

A central console for a vehicle having a ventilated storage compartment which is connected via at least one air inlet to at least one air duct in order to ventilate the vehicle rear, and having a control device for opening and closing the one air inlet. For the purpose of ventilating the storage compartment without adversely affecting the cross section of the air duct which continues in order to ventilate the rear, at least one air duct runs laterally past the storage compartment, and the air inlet is arranged in the front end wall of the storage compartment and the air duct is widened in that duct section which is mounted upstream of the air inlet.

10 Claims, 1 Drawing Sheet

Fig. 1

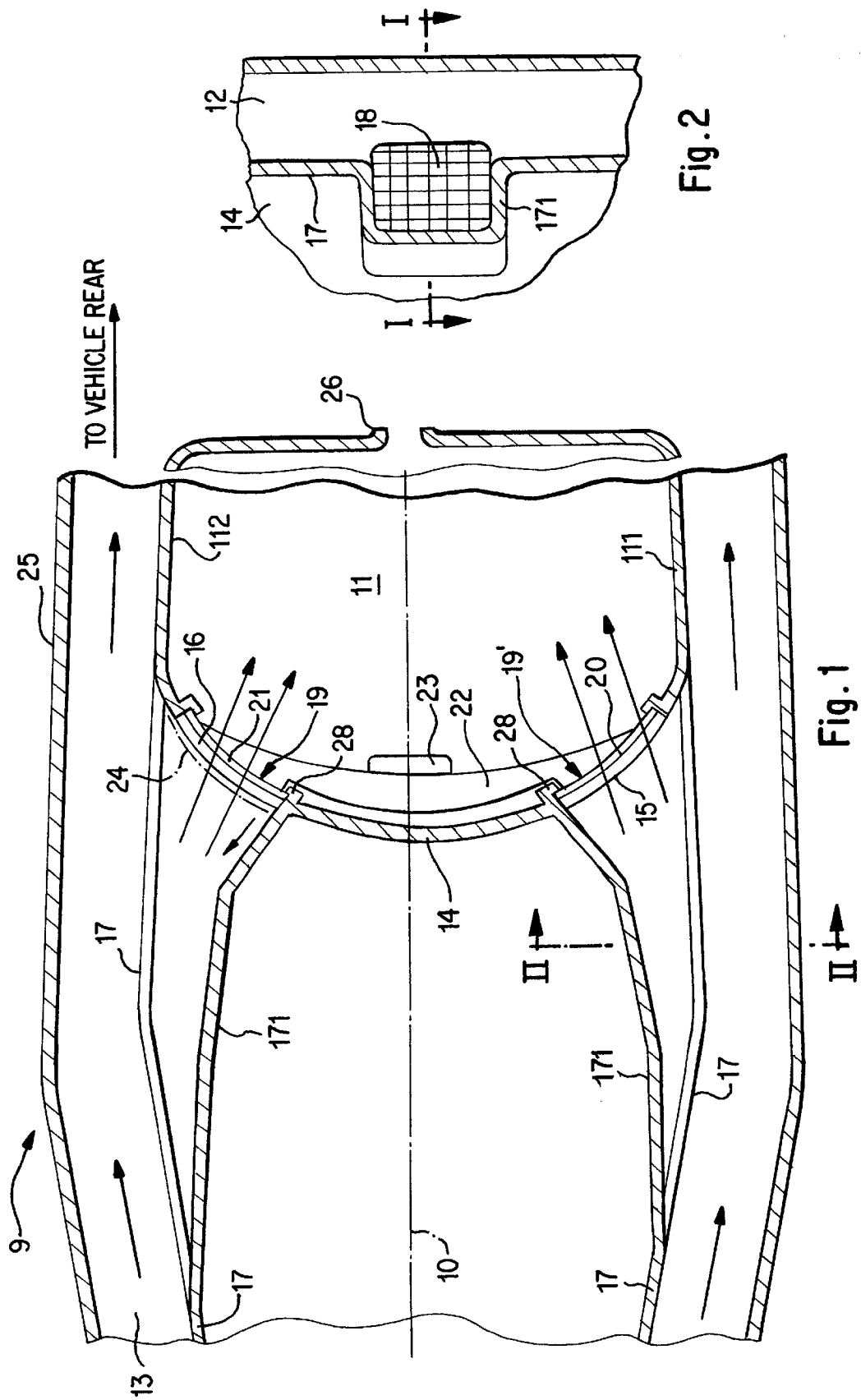

CENTRAL CONSOLE FOR VEHICLES

CROSS REFERENCE TO RELATED APPLICATION

Priority is claimed with respect to German Application No. 199 35 270.4-21 filed in Germany on Jul. 27, 1999, the disclosure of which is incorporated herein by reference.

BACKGROUND OF THE INVENTION

The invention relates to a central console for vehicles having a ventilated storage compartment.

In the case of a known central console of this type (Mercedes E-class saloon), at least one air duct, which opens out into a rear central nozzle at the rear end of the central console, is guided past on the lower side of the storage compartment and has a duct-wall opening which is congruent with the air inlet in the storage compartment. The control device is designed as a pivotable siphoning-off flap which, when closed, closes the air inlet and, when the air inlet is opened, protrudes into the air duct siphoning off, towards the air inlet, some of the air flowing in the air duct and thereby reduces the air-passage cross section of the continuing air duct.

The invention is based on the object, in the case of a central console of the type mentioned at the beginning, of ventilating the storage compartment without adversely affecting the cross section of the continuing air duct.

SUMMARY OF THE INVENTION

The central console according to the invention has the advantage that the integral duct expansion arranged upstream of the air inlet causes the air to pass into the storage compartment in a favourable manner in terms of flow, and the duct section which is guided past the air inlet keeps its original duct cross section without any change. Because of the arrangement of the air inlet in the end wall of the storage compartment, specifically directly in the vicinity of the side wall past which the at least one air duct is guided, the air can flow through the storage compartment without any great deviation and can emerge again out of the storage compartment at the opposite end.

Advantageous embodiments of the central console according to the invention together with expedient developments and refinements of the invention are specified in the further patent claims.

According to a preferred embodiment of the invention, the maximum cross section of the widened portion of the duct is matched to the cross section of the air inlet, and the duct is widened by means of a curvature in the duct wall situated closest to the longitudinal axis of the central console.

BRIEF DESCRIPTION OF THE DRAWING

The invention is described in greater detail in the following with reference to an exemplary embodiment represented in the drawing, in which, in each case in schematic representation:

FIG. 1 shows part of a longitudinal section according to the line I—I in FIG. 2 of a central console with a ventilated storage compartment, FIG. 2 shows a section along the line II—II in FIG. 1.

DETAILED DESCRIPTION OF THE PREFERRED EMBODIMENTS

The central console 9, shown in part in a horizontal longitudinal section in FIG. 1, for a vehicle is arranged in a known manner centrally between the two front seats of the vehicle and, in the case of vehicles having a propeller shaft panel, is placed on the latter. The central console has, among other things, a ventilated storage compartment 11 and a rear central nozzle (not represented here) which is integrated in the end region facing the rear or back seats of the vehicle, for the purpose of ventilating the rear of the vehicle. The rear central nozzle is connected via two air ducts 12, 13 which are integrated in the central console, to a ventilating device preferably to the air distributor of an air conditioning system, of the vehicle. As can be seen from FIG. 1, the two air ducts 12, 13 are guided past the storage compartment 11 on the left and right thereof In order to ventilate the storage compartment 11, the said compartment has two air inlets 15, 16 which are arranged in the front end wall 14 of the storage compartment 11 and are each arranged in the vicinity of one of the two side walls 111, 112 of the storage compartment 11. Each air inlet 15 or 16 is connected to a respective air duct 12 or 13 which is widened for this purpose in the duct section mounted upstream of the air inlet 15 or 16. The cross section of the widened portion of the duct is at the maximum directly at the air inlets 15, 16, where it corresponds to the cross section of the assigned air inlet 15 or 16, and decreases at an increasing distance from the assigned air inlet 15 or 16, so that the air duct 12 or 13 again assumes its approximately constant cross section over the entire duct length. As can be seen from the sectional representation in FIG. 2, the duct is widened by means of the chanrLel offset 171 in the duct wall 17 situated closest to the longitudinal axis 10 of the central console. As can be seen from the sectional representation of FIG. 1, this channel offset 171 in the duct board 17 increases towards the air inlet 15 or 16 and decreases in the opposite direction.

As is represented in FIG. 2 with regard to the air inlet 15, each air inlet 15, 16 is covered with a perforated or mesh grid 18 which prevents relatively small objects from the storage compartment 11 from being able to penetrate into the air duct 12 or 13. Each air inlet 15, 16 is assigned to a control device 19', 19 for opening and closing the air inlet 15 or 16. As is represented in FIG. 1, the two control devices 19', 19 are coupled together, so that they are opened and closed synchronously. In the exemplary embodiment of FIG. 1, each control device 19', 19 is designed as a slide 20 or 21 which is guided in a displaceable manner in the vertical direction on the inside of the front end wall 14 of the storage compartment 11. The two slides 20, 21 are connected together by a gripping strip 22 which can be operated by means of an integrally formed gripping element 23. An alternative design of the control devices 19', 19 for the air inlet 16 is represented in FIG. 1 by dash-dotted lines. In this case, the control device 19' is designed as a pivoting flap 24 which is mounted pivotably at 25 on the outer wall of the front end wall 14 of the storage compartment 11. In its closed position, the pivoting flap 24 completely covers the air inlet 16 and in its open position uncovering the air inlet 15 is aligned with the duct wall 17 which has the channel offset 171.

When the air inlet 15 or 16 is opened, some of the air flowing to the rear central nozzle in the air ducts 12, 13 flows without being greatly deflected via the air inlets 15, 16 through the storage compartment 11 and emerges again out of an air outlet 26 of the said storage compartment at the end thereof which lies opposite the front end wall 14. The quantity of air branched off from the airflow in the air ducts 12, 13 is determined by the cross section, uncovered by the control devices 19', 19, of the air inlets 15, 16. Provided in the two control devices 19', 19 are latching means 28 which are effective in every displacement position of the slides 20, 21 or pivoted position of the pivoting flaps 24 and which keep the control devices 19', 19 in the setting required over a long period.

When the air inlet 15 or 16 is opened, some of the air flowing to the rear central nozzle in the air ducts 12, 13 flows without being greatly deflected via the air inlets 15, 16 through the storage compartment 11 and emerges again out of the said storage compartment at the end thereof which lies opposite the front end wall 14. The quantity of air branched off from the airflow in the air ducts 12, 13 is determined by the cross section, uncovered by the control devices 18, 19, of the air inlets 15, 16. Provided in the two control devices 18, 19 are latching means (not represented here) which are effective in every displacement position of the slides 20, 21 or pivoted position of the pivoting flaps 24 and which keep the control devices 18, 19 in the setting required over a long period.

While the above description constitutes the preferred embodiment of the invention, it will be appreciated that the invention is susceptible to modification, variation, and change without departing from the proper scope or fair meaning of the accompanying claims.

What is claimed is:

1. In a central console for use in a vehicle, said console having a ventilated storage compartment which is connected via at least one air inlet to at least one air duct for the purpose of ventilating a rear portion of the vehicle, and having a control device for opening and closing the at least one air inlet, wherein the at least one air duct is guided laterally past the storage compartment, the air inlet is arranged in a front end wall of the storage compartment and the at least one air duct has a widened portion in that duct section which is mounted upstream of the air inlet.

2. The central console according to claim 1, wherein the cross section of the widened portion of the duct corresponds to the cross section of the inlet.

3. The central console according to claim 1, wherein the widened portion of the duct is widened by means of a channel offset in the duct wall situated closet to the longitudinal axis of the central console.

4. The central console according to claim 1, wherein the at least one air inlet is covered with a perforated or mesh grid.

5. The central console according to claim 1, wherein latching devices which are effective at least in the closed and open position of the control device are provided on the control device.

6. The central console according to claim 1, wherein the control device is designed as a slide.

7. The central console according to claim 1, wherein the control device is designed as a pivoting flat.

8. The central console according to claim 1, wherein a respective air duct which is connected to an air inlet in the front end wall of the storage compartment is guided past on the left and right of the storage compartment, and in that the air ducts are integrated in the central console.

9. The central console according to claim 8, wherein the control devices which are respectively assigned to the air inlets are coupled together.

10. The central console according to claim 1, wherein an air outlet is provided in that end region of the storage compartment which faces away from the front end wall which has the air inlets.

\* \* \* \* \*